8450X
H. N. Camp,
Cook Stove.
Patented Oct. 14. 1834.
Front-view
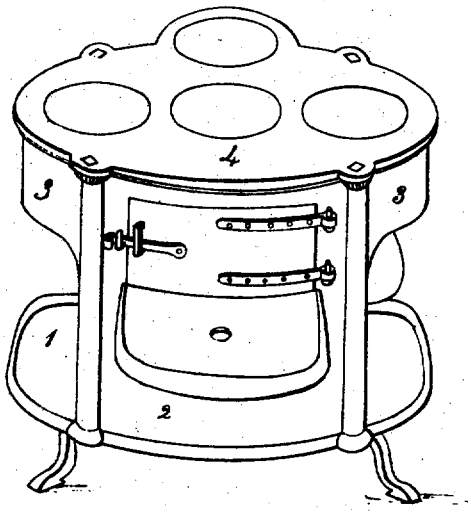
Back-view
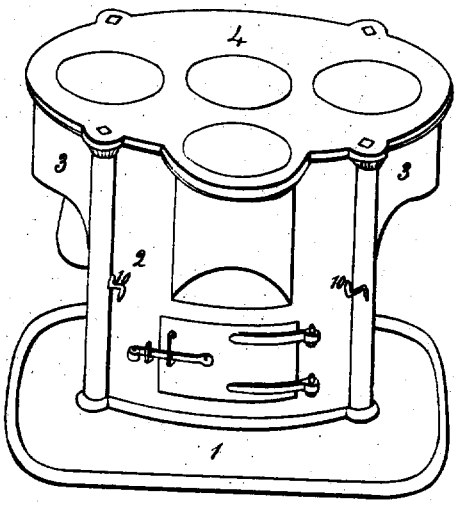
Section
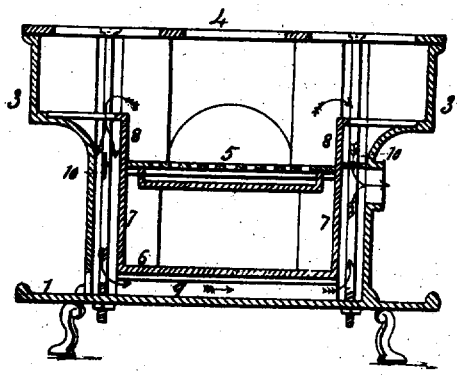

Henry William Camp
Letters Patent

8450X

The schedule referred to in these Letters Patent and making part of the same containing a description in the words of the said Henry William Camp himself, of his improvement in the common Iron Cooking Stove

---

To all to whom these presents shall come: Be it known that I Henry W. Camp of Owego in the County of Tioga and State of New York have invented a new and useful improvement in the construction and operation of the common Iron Cooking Stove; and that the following is a full and exact description of the construction and operation of the said Stove as invented or improved by me; that is to say. The size and form of the stove is not so material and in these it may be varied. The following is a description of one of an ordinary size and shape with the proportions. The body of the stove being oblong has swelled sides and ends. The swelled or curved ends extend but part of the way from the top down. leaving the base or bottom part of the stove of much lefs dimensions than the upper part and has but two doors. one the fire door on the front side of the stove for putting in fuel, and the other the oven door on the backside of the stove The body of the stove is twenty two inches and a half high and three feet in length acrofs the top and about 22 inches wide including the projection for the reception of a boiler on the back side. the base or lower part being about 28 inches long and 14 inches wide through the centre and 9 through the ends; and has two hearths one on the front and one on the back side of the stove. the upper or fire hearth on the front side is sunk for holding ashes and coals, and the lower or oven hearth on the back side for the convenience of the oven which is in the lower part of the stove. The whole stove being an irregular figure of which a more perfect idea may be formed from the following description of the several plates and parts. 1st The bottom plate is an oblong

8450X oblong figure with straight and parallel ends, curved or rounded corn-
ers and in the front side curved or swelled out 3 inches and straight
on the back side, three feet long and two feet 2 inches in width across
the centre, On the top of which plate is a moulding three fourths of
an inch high running ^entirely around its outer edge and a like moulding
runs out from the front moulding and distant about two inches
from and within the outer end moulding and curves across the plate
lengthwise so as to form with the front moulding an enclosed area
about 28 inches long and nine inches wide at the ends and 14 in the
centre of the curve for the reception of the upright plates which form
the body of the stove, all of which mouldings are cast solid with the
plate. Leaving the remainder of the plate projecting from under the
body of the stove on the back side and at the ends so as to form a
hearth for the oven about 12 inches wide before the oven door and 3 in-
ches at the ends of the stove. The front edge of the plate and the mould-
ing are ornamentally projected near the corners to form the bases of the
pilasters. On the under side of which plate are ordinary brackets for
fixing the cast iron legs which are about 4 1/2 inches long on which the
stove stands 2nd. The side plates are two feet wide and twenty two
inches high the front one of which curves or swells from one side to the
other outwardly about 2 1/2 inches from a plane surface and has an
opening in it above the middle of the plate and equidistant from the
sides of the plate 16 inches long and 7 1/2 inches high for a door to the fire
and through which the upper or fire hearth passes, irregularly formed
on the under side to fit the bottom of the sunk hearth which projects
over and rests on it. The back side plate is curved in like man-
ner about one and a half inch from a plane and has a like open-
ing, 12 inches long and 7 inches high for a door to the oven and is
equidistant from the sides and two and a half inches from the bottom
plate or hearth, and two and a half inches above this door is a pro-
jection of this plate which at the top is of a circular form projecting
five inches extending in this form from the top of the stove down 5 inch-
es and then terminating in an oblique plane of 5 1/2 inches in length
slanting slanting into the body of the stove and terminating 2 and one half inches
above the top of the oven door forming an area within the stove for
the acception of a boiler. These side plates have also several perpendic-
ular and horizontal mouldings on their insides for the purpose of sup-
porting several plates hereinafter described. These side plates have
about two inches of the perpendicular edges curved or swelled out
representing externally pilasters and forming hollows internally through
which the binding rods pass from the top to the bottom plates and
also forming grooves or shoulders within which the end plates are fit-
ted. 3. The end plates are of the same height and are curved out-
wards in nearly a half circle extending from the top down 7½ inches
where about three inches of the projection terminates by the plates be-
ing scolloped or curved in and down three inches and there forming a
plane surface which extends to the bottom plate about 11½ inches. One ✓
of which end plates has an elliptical opening in it 9 inches in length
and three inches in width placed horizontally and directly beneath
the three inch curve or concave for the passage of the smoke and sur-
rounded externally by a flange for the reception of a stove pipe. The
top of this flange is about 9 inches from the top of the stove. Through
the other end plate and on the hearth or bottom plate is a small
aperture three inches by two for the purpose of clearing the flue under
the oven and cooling the oven. 4th The top plate is so formed as to
fit the side and end plates of the stove with a moulding on the under
side around its outer edge projecting three fourths of an inch which
binds all the upright plates together. This plate has four apertures
of a circular form and nine inches diameter for the reception of boilers
or other stove furniture which are covered with cast iron lids, and
this plate and the moulding project in four places in an ornament-
al form for the capitals of the pilasters. 5th The fire plate is a hori-
zontal plate two feet long extending through the stove except the two
inch spaces at the ends for the flues and is about equidistant from the
bottom & top plates and forms the top of the oven resting on a mould-
ing on the back plate and also resting on the front plate through
which

8450X which it projects to form a hearth, and also on the upright end p
of the oven which are two inches from the end plates of the stove an
together with the bottom plate of the oven form the flue which pa
under the oven. This fire plate is 23½ inches long and about 13 in
within the stove and at the distance of from 1½ to 2 inches from t
side of the stove or edge of the plate it is sunk one and three fo
inch and projects thro' the front plate fifteen inches, being 14
inches in width where it passes the front plate and forms a circ
sunk hearth with a moulding extending around its outer edge.
sunk part of the hearth approaches within a half inch of the mould
except at the distance of five inches from the front plate where it
creases to two inches. A circular groove or shoulder runs around
upper edge of the sunk part 3/8ths of an inch deep in which is fitte
a plate which forms the upper side of the hearth and has a roun
inch hole in its centre to admit the air and a moulding one ha
inch high on the top of its inner edge fitted for the purpose of clo
the draught under the door and this plate may be partially o
wholly removed at pleasure for the purpose of creating a draug
or to use a gridiron. The sunk part of the plate within the s
is covered with a fire grate of a rectangular form fitted to cover
6th. The oven plate or plate which forms the bottom of the oven i
feet long and is two inches above and parallel with the bottom
leaving a flue underneath it and extends to the side plates a
to within two inches of the end plates joining the end plates of th
oven and is supported by mouldings cast on the side plates.
7th. The two end plates of the oven are 10½ inches long and 9 inc
high and rectangular and are placed perpendicularly between
oven plate and fire plate and meet the side plates and are s
ted by mouldings on the side plates near the grooves or pilaster
s. 8th. There are two perpendicular plates placed one on ea
end of the fire plate 4 inches high and extending across the width
the stove at the distance of five ½ inches from the end plates
the purpose of throwing the fire upon the boilers and forming th and protecting them from ashes. each plate having on its upper edge a horizontal grate cast solid on and forming with it a right angle. each of which grates extends towards the end plate in a circular form so as to cover the flues and protect the dampers from coals or fuel and these are held firmly in their places by mouldings cast on the side plates for that purpose. 9th. There are two flues or what is called a double flue. One is the long flue and extends over one of the plates last mentioned, passing through the grate and down between the end plate and this grate-plate and still down between the end plate of the stove and that of the oven to the bottom plate, and passes under the oven and up on the other end of the stove between plates like those at the end where it passes down to the aperture where it passes off 8½ inches from the bottom plate. And the other flue passes over the other upright plate and through its grate and down 4½ inches directly to the aperture where it meets the long flue and both are discharged through the same into the pipe or chimney. 10th. There are two dampers formed of flat pieces of cast iron 9 inches by three extending at each end to form pivots and rounded at the corners and beveled on one edge to fit and close the flue and rounded on the pivot edge for turning placed horizontally in the flues and resting on the ends of the fire plates with one pivot of each resting in countersinks in the front plate, and the other passing through the back side plate and made square so as to be turned on the outside with a small crank fitted to them for the purpose of closing either of the flues and regulating the draughts and for partially or wholly turning the fire under the oven or passing it off through the short flue and thus regulating the heat of the oven. The whole stove being bound together by four wrought iron rods passing through perpendicularly with heads in counter sunk holes in the top plates and nuts on the rods beneath the bottom plate- the whole stove being of cast iron except the rods and trimmings. The improvements claimed are principally as follows- 1st In the form and construction of the flues & dampers for the purpose

8450X pose of directing and regulating the fire. being so constructed as to
cause a draught of heat from the fire both ways and equalize
turn it one way or the other by simply moving one or both dam
ers so as to apply the heat where it may be needed and turn
under the oven or not or partially so for baking with greater fa
ty and better, the heat being by this process distributed equa
if necessary through the whole stove and applied so directly up
the boilers and cooking utensils or oven as to require less fuel
any other differently constructed stove or fire place whatever,
furnish the same facilities - all of which is further described a
2nd In the form and construction of the fire hearth which is also
scribed above, comprising an ordinary hearth on the top plate
ordinary use and convenience and a sunk hearth under it w
can (with the sunk plate within the stove) contain convenien
quantities of coals and ashes for cooking and forms a recepta
for ashes from the burning fuel which is upheld by the grate a
described and by means of this and the draught made to burn fre
and advantageously. This draught being caused and increa
or diminished by means of a hole in the centre of the upper plate
the hearth and the partial or entire removal of this plate
is removed entirely to admit of the use of a gridiron or other co
ing utensil. 3d. In the oven and the application of the heat
it & its location. It being so situated that it may have only
gentle heat all around it or a heat on the upper side only
intense heat all around it or otherwise, and which heat m
shut off at once and cool air allowed to pass into the bottom
4th. In the situation of the main flue and flange for conduct
the smoke in such a manner and place as to ensure a draugh
admit of a beneficial use of the two flues and the dampers abo
mentioned. 5th. In the formation and construction of the perp
ular plates which form the flues with the grates attached to t
the whole of each being one piece cast solid and forming an ent
tection over the flues against the admission of fuel or other thi 8450X 119.

into the flues or on to the dampers without obstructing the draught as further described above. 6th In the formation of the top plate and location of the four boilers in it so as to receive the heat from the fire on all of them equally. 7th The form and location of the fire grate over the sunk part of the plate within the stove, it being so placed as to admit of burning stone or charcoal and this too immediately under the boilers.

Witnesses
Charles C. Noble
Horace B. Dickinson

Henry William Camp 2699.1.80]

Drawing
(Patented October 14. 1834)